Jan. 22, 1963  A. J. KROECKEL  3,074,151
LAMINATED AIR TURBINE ROTOR AND METHOD OF MAKING THE SAME
Filed Oct. 19, 1959  2 Sheets-Sheet 1

INVENTOR
ALFRED J. KROECKEL
BY
ATTORNEY

Jan. 22, 1963 A. J. KROECKEL 3,074,151
LAMINATED AIR TURBINE ROTOR AND METHOD OF MAKING THE SAME
Filed Oct. 19, 1959 2 Sheets-Sheet 2

INVENTOR
ALFRED J. KROECKEL
BY
ATTORNEY 3,074,151
LAMINATED AIR TURBINE ROTOR AND METHOD
OF MAKING THE SAME
Alfred J. Kroeckel, North Hollywood, Calif., assignor to Viber Company, Burbank, Calif., a corporation of California
Filed Oct. 19, 1959, Ser. No. 847,312
2 Claims. (Cl. 29—156.8)

This invention relates to air turbine rotors having air passages terminating in the peripheral surface and to the method of making turbine rotors by fabrication from sheet metal punchings.

In the making of rotors for air turbines having peripheral entry of the air stream, a difficulty has been to provide air passages through the wheel which are of uniform shape and free from structural defects. Rotors of this type have heretofore been made by metal casting processes in which the air passages are formed by the lost wax or equivalent processes. The castings thus made are not always uniform as to the air passages and as to the partitions defining the air passages. Furthermore, when this method of forming turbine rotors is employed, separate tooling must be provided for each different diameter of the rotor and each different thickness or width of the air passages or rotors. It is also necessary to provide separate tooling for any change in the orientation of the air passages with respect to the radii of the rotor.

I have discovered that turbine rotors of many sizes, both as to diameter and thickness, may be made with substantially a single tooling setup by employing a laminated disc structure in each disc of which holes are punched at the selected angle with respect to the radii, and of the selected diameter for the rotor.

It is therefore one object of my invention to provide a method for fabricating air turbine rotors from punched sheet metal laminae. Another object is to provide a method for making air turbine rotors by which rotors of many sizes may be fabricated, as selected, from readily available sheet metal disks, with a single set up of the major tooling being applicable to many different sizes of rotors. Another object is to provide a laminated disc rotor for an air turbine. Still another object is to provide a high speed motor particularly applicable to high frequency vibration devices.

These and other objects are attained by my invention, which will be understood from the following description, reference being made to the accompanying drawing in which FIG. 1 is a diametric cross-sectional view, partly in elevation, showing an air turbine rotor following my invention;

Figure 1:
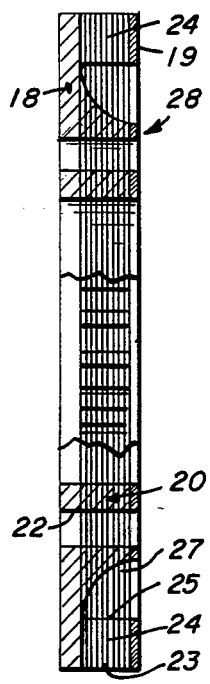
Figure 2:
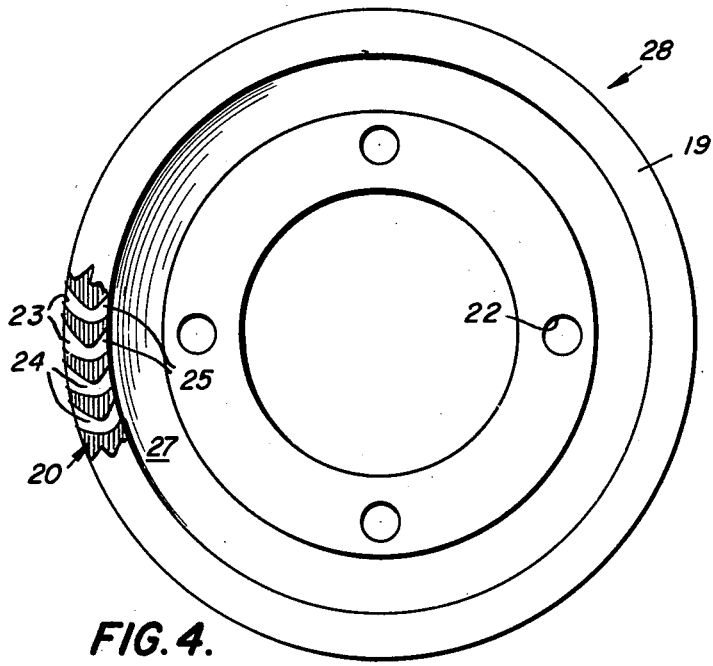
FIG. 2 is a side elevation view of the same, with parts broken away to show the air passages and partitions.
Figure 3:
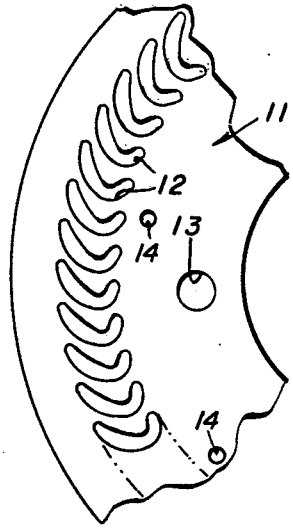
FIG. 3 is a fragmentary elevational view of a punched metal disc for a fabricated rotor.
Figure 4:
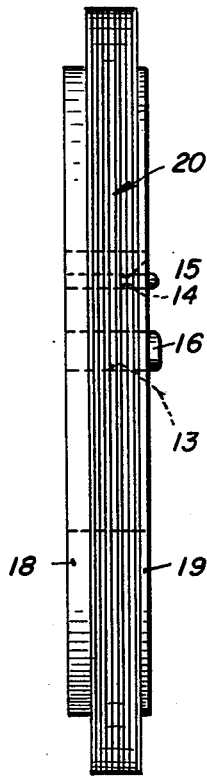
FIG. 4 is an edge elevational view of a stack of punched discs on a back plate, and including a shroud.
Figure 5:
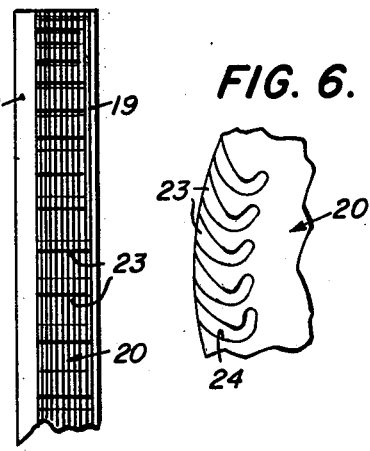
FIG. 5 is an edge elevational view of a stack of discs after the outer periphery has been turned down to expose the ends of the passages.
Figure 6:
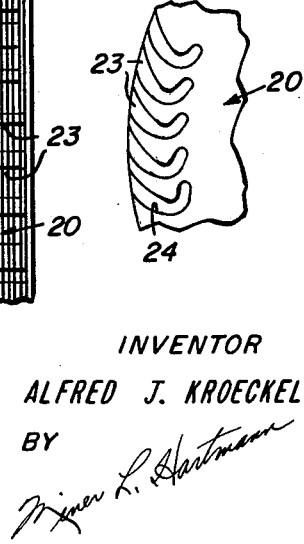
FIG. 6 is a fragmentary phantom view of a partly finished rotor, showing how the periphery of the disc is cut back to expose the peripheral openings for the air passages.
Figure 7:
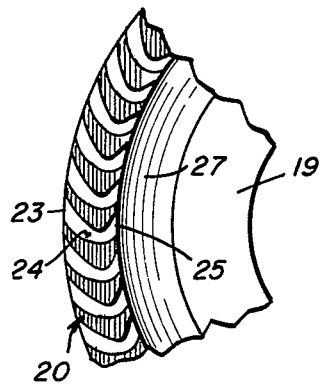
FIG. 7 is a fragmentary phantom view of a finished rotor showing the inside cut or bore which exposes the exit ends of the air passages.

The process of making my fabricated rotor is illustrated by steps in the drawings. A steel or other metal disc 11, somewhat oversize for the desired rotor, is provided with a succession of punched holes 12 spaced inwardly from the periphery, the shape of the holes being carefully designed to give, in the finished rotor, the air passages which will provide the desired thrust when the air jet is directed into them. The shaped holes 12 are spaced and orientated in the selected peripheral circle, the number of holes depending upon the diameter of the circle and the desired width of the holes. The discs are also conveniently provided with an alignment hole 13 and assembly pin holes 14 which are adapted to be received on the alignment pin 15 and assembly pins 16 which are perpendicularly mounted in the rotor back plate 18. After the discs 11 have been punched, the number required to give the desired thickness to the rotor are assembled in a stack on the pins 15 and 16. A shroud 19 of steel plate is placed on top of the stack, to form an assembly. The assembled discs 11, the back plate 18, and the shroud 19 are then furnace brazed to form a consolidated blank 20. Spaced apart mounting holes 22 are then drilled into the body of the brazed blank, which is turned down as on a lathe, at the periphery until the outside or peripheral openings 23 of the disc holes 12, which have now become shaped air passages 24, are exposed as shown in FIGS. 5 and 6. The "turned down" blank 20 is then bored out, as shown in FIGS. 1, 2 and 7 to expose the inner ends or outlets 25 of the air passages 24. An annular air discharge channel 27 is provided so that exhaust air passing out of these passages may be discharged in an axial direction.

Figure 8:
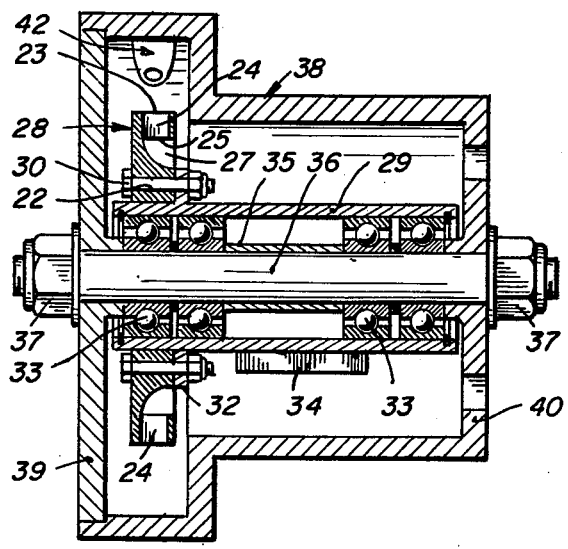
FIG. 8 is a side elevational view partly in section of a simple air turbine motor having a fabricated disc rotor, the rotor system being eccentrically weighted for producing high frequency mechanical vibrations.

The air turbine rotor made in accordance with my new method may be mounted for operation and use in many different ways. Illustrating one of these, I have shown in FIG. 8 a side elevational view partly in section, a completed turbine rotor mounted to provide rapid rotation of an eccentric weight as a source of vibrational energy, for example for shaking bins and the like to effect settling or movement of granular materials in the bin. The turbine rotor 28 is mounted on the tubular bearing housing 29 by bolts 30 passing through the mounting holes 22 and through corresponding holes 31 on the mounting flange 32 of the housing. The bearing housing 29 is mounted for rotation on twin ball bearings 33 at the ends thereof, their being an eccentric weight 34 attached to one side of the bearing housing 29. A bearing spaced 35 is provided between the pairs of ball bearings 33. A main shaft 36 is rigidly mounted by end nuts 37 in the vibrator casing 38, which consists of two end plates 39 and 40. A nozzle 42 is mounted in the cylindrical housing to direct a jet of air against the peripheral openings 23 of the passages 24. Air exhaust holes are provided in the end plates 39 and 40, so that there will be no back pressure. Very high speeds up to about 20,000 r.p.m. maybe attained by the rotor, under impact of compressed air through the nozzle 42. This produces high frequency vibration because of the eccentric loading by the weight 34, which is transmitted to other objects by attachment of the vibrator casing thereto.

The objectives set forth in the beginning hereof have been attained.

I claim:
1. The method of forming an air turbine rotor having non-radially orientated fluid passages leading from the periphery to a smaller diameter exhaust groove, comprising the steps of punching a succession of spaced apart fluid-passage-shaped holes in the outer peripheral portion of a plurality of sheet metal discs, the side walls of each of said holes defining a portion of an air passage for said rotor, stacking said discs with punched holes in alignment on a back plate, consolidating said pile of discs and said back plate as by furnace brazing into a unitary cylindrical work blank, machining off the periphery of said blank to a depth sufficient to expose the outer mouths of said openings formed by said punched holes in said discs, machining an annular exhaust groove whose outer peripheral wall exposes the inner mouths of said openings formed by said punched holes in said discs; and mounting said rotor for rotation about the axis of said back plate.

2. The method of forming an air turbine rotor having non-radially orientated fluid passages leading from the periphery to a smaller diameter exhaust groove, comprising the steps of punching a succession of spaced apart air-passage-shaped holes in the outer peripheral portion of a plurality of sheet metal discs, the side walls of each of said holes defining a portion of an air passage for said rotor; stacking said discs with punched holes in alignment between a back plate and a shroud plate, consolidating said pile of disks, backplate and shroud plate as by furnace brazing into a unitary cylindrical work blank, machining off the periphery of said blank to a depth sufficient to expose the outer mouths of said openings formed by said punched holes in said discs, machining an annular exhaust groove from the face defined by said shroud to expose the inner mouths of said openings formed by said punched holes in said discs; and mounting said rotor for rotation about the axis of said back plate.

References Cited in the file of this patent

UNITED STATES PATENTS

| | | |
|---|---|---|
| 702,461 | Nadrowski | June 17, 1902 |
| 1,469,925 | Kasley | Oct. 9, 1923 |
| 1,470,497 | Steenstrup | Oct. 9, 1923 |
| 2,325,617 | Lysholm et al. | Aug. 3, 1943 |
| 2,348,511 | Armel | May 9, 1944 |
| 2,354,304 | Celio | July 25, 1944 |
| 2,409,966 | Voity et al. | Oct. 22, 1946 |
| 2,418,829 | Gibbs | Apr. 15, 1947 |
| 2,432,185 | Watson | Dec. 9, 1947 |
| 2,618,462 | Kane | Nov. 18, 1952 |
| 2,700,211 | Woolf | Jan. 25, 1955 |
| 2,778,204 | Frank | Jan. 22, 1957 |
| 2,825,124 | Nichols et al. | Mar. 4, 1958 |

FOREIGN PATENTS

| | | |
|---|---|---|
| 16,157 | Great Britain | 1902 |
| 61,948 | Austria | Nov. 10, 1913 |
| 141,017 | Great Britain | Dec. 17, 1919 |